United States Patent [19]

Teranishi et al.

[11] Patent Number: 5,633,684
[45] Date of Patent: May 27, 1997

[54] IMAGE INFORMATION COMPRESSION AND DECOMPRESSION DEVICE

[75] Inventors: Yasuhiko Teranishi, Kanagawa-ken; Seiji Higurashi, Tokyo; Mitsuo Harumatsu, Kanagawa-ken, all of Japan

[73] Assignee: Victor Company of Japan, Ltd., Yokohama, Japan

[21] Appl. No.: 365,079

[22] Filed: Dec. 28, 1994

[30] Foreign Application Priority Data

Dec. 29, 1993 [JP] Japan .................. 5-352615

[51] Int. Cl.⁶ .................................................. H04N 7/18
[52] U.S. Cl. .................. 348/398; 348/396; 348/397; 348/409; 348/416
[58] Field of Search ........................ 348/398, 397, 348/396, 406, 407, 408, 384, 405, 420, 421

[56] References Cited

U.S. PATENT DOCUMENTS

| 4,943,855 | 7/1990 | Bheda et al. | 348/397 |
|---|---|---|---|
| 4,969,040 | 11/1990 | Gharavi | 348/398 |
| 5,001,561 | 3/1991 | Haskell et al. | 348/407 |
| 5,040,062 | 8/1991 | Knauer et al. | 348/406 |
| 5,048,111 | 9/1991 | Jones et al. | 348/397 |
| 5,173,773 | 12/1992 | Ueda et al. | |
| 5,235,420 | 8/1993 | Gharavi | 348/398 |
| 5,235,421 | 8/1993 | Yang | 348/398 |
| 5,446,495 | 8/1995 | Tourtier et al. | 348/398 |
| 5,473,384 | 12/1995 | Jayant et al. | 348/397 |
| 5,491,561 | 2/1996 | Fukuda | 348/396 |
| 5,504,529 | 4/1996 | Sugiyama | 348/397 |

FOREIGN PATENT DOCUMENTS

| 2-16887 | 1/1990 | Japan . |
|---|---|---|
| 4-322593 | 11/1992 | Japan . |

OTHER PUBLICATIONS

See Attached Page of Seven Listed Documents.
WO-A-93 20653 (Bell Communications Research, INC) Oct. 1993.
EBU Technical Review No. 251, Mar. 21, 1992 EBU, Brussels, BE, pp. 34–44, XP 000275389, Mau et al "Sub-band Source Coding for HDTV".
FR-A-2 661 062 (Thomson-CSF) Oct. 1992.
WO-A-94 22267 (Thomson-CSF) Sep. 29, 1994.
EP-A-0 561 448 (561 448 (Koninklijke PTT Nederland N.V.), Sep. 1993.

(List continued on next page.)

Primary Examiner—Tommy P. Chin
Assistant Examiner—Anand S. Rao
Attorney, Agent, or Firm—Michael N. Meller

[57] ABSTRACT

An image information compression and decompression device produces a low frequency band signal suitable for reproduction of a standard definition (SD) image and a combined high frequency band signal which, when processed together with the low frequency band signal, can reproduce a high definition (HD) image. These signals are derived from a high definition (HD) image signal and are subjected to motion compensation prediction coding. An I picture of the HD image is divided into a plurality of band signals which are coded and quantized by a coding/quantizing circuit. Thus, an intra-plane coding of the divided image signal is performed for the I picture. For a P picture of the HD image, a low frequency band signal is derived and a combined high frequency band signal excluding the low frequency band signal is produced. The low frequency band signal and the combined high frequency band signal are subjected to motion compensation prediction coding by a motion compensation prediction coding circuit. This results in a system which is compatible to both standard and high definition television systems.

6 Claims, 10 Drawing Sheets

OTHER PUBLICATIONS

IEEE Journal on Selected Areas in Communication, vol. 11, No. 1, Jan. 1, 1993 New York US, pp. 146–151, XP 000378006, Delogne et al "compatible Coding of Digital Interlaced HDTV".

EP–A–0 577 395 (Victor Company of Japan, LTD.) Jan. 5, 1994.

Jozawa, H. et al., Technical Report of the Electronics Information and Communication Engineers 1E–91–82 (Nov. 1991), "Frequency Domain Realization of ——".

IMAGE INFORMATION COMPRESSION AND DECOMPRESSION DEVICE

BACKGROUND OF THE INVENTION

1. Field of the Invention

The present invention relates to an image information compression and decompression device in which a high definition (HD) image signal is processed by dividing it into a signal (compatible component) suitable for reproduction of a standard definition (SD) image and a signal (complementary component)which, when processed together with the compatible component signal, can reproduce the HD image. In particular, the present invention relates to an improvement of an image information compression and decompression device which is suitable when used together with a sub-band division and a motion compensation prediction coding for interframe or interfield movement.

2. Description of the Prior Art

In view of the widespread use of current television systems, it has been decided that both a SD image television system, such as NTSC, and a television system for HD image be utilized. In order to achieve compatibility between the HD image and the SD image, an image signal coding having hierarchy has been investigated. For example, in Sawada et al., "CTV/HDTV Compatible Coding Scheme," D-335, 1992, the Spring Meeting of the Electronic Information Communication Society of Japan, a pyramid coding system is disclosed in which a portion of a bit stream obtained by coding an HD image information is derived to obtain an SD image information.

This coding system will be described with reference to FIG. 1. An input HDTV signal is filtered and sub-sampled by a filter/sub-sampling circuit (100) and then coded by a coder (102). As a result, a coded component corresponding to the SD signal is output from the coder (102). The SD corresponding component is transmitted or recorded on the one hand, and locally decoded by a decoder (104), data-interpolated by an interpolation circuit (106) and supplied to a subtracter (108) on the other hand. In the subtracter (108), a difference component between the HDTV signal and the locally decoded signal is produced. That is, a difference component is obtained, which, when combined with the SD corresponding component, provides the HD image. The difference component is coded by a coder (110).

A sub-band coding system, shown in FIG. 2, which comprises a sub-band dividing circuit (144) and a sub-band combining circuit (180) is an example of the coding system having hierarchy. In the sub-band dividing circuit (144), shown in FIG. 2, an HDTV signal is band-divided horizontally by sub-band analysis filters (120) and (122), and outputs of these filters are sub-sampled by sub-sampling circuits (124) and (126), respectively. A low frequency band output from the sub-sampling circuit (124) is further band-divided vertically by sub-band filters (128) and (130). Output signals of the sub-band filters (128) and (130) are sub-sampled by sub-sampling circuits (132) and (134), respectively. On the other hand, a high frequency band output from the sub-sampling circuit (126) is further band-divided vertically by sub-band filters (136) and (138). Output signals of the sub-band filters (136) and (138) are sub-sampled by sub-sampling circuits (140) and (142), respectively.

Thus, horizontally and vertically band-divided signals LL, LH, HL, and HH are obtained by the sub-band dividing circuit (144). These band signals are suitably encoded (not shown), and then transmitted or recorded. FIG. 3 shows the band division. Among others, the LL band signal corresponds to the SD corresponding component and the remaining LH, HL, and HH band signals correspond to the difference component.

Returning to FIG. 2, the band signals LL, LH, HL, and HH received or reproduced are suitably decoded (not shown), interpolated by interpolation circuits (150–156), and then filtered by sub-band synthesis filters (158–164), respectively. Outputs of the sub-band synthesis filters (158) and (160) are combined vertically by an adder (166) and outputs of the combining filters (162) and (164) are combined vertically by an adder (168). After the combined outputs of the adders (166) and (168) are interpolated by interpolation circuits (170) and (172) and filtered by sub-band synthesis filters (174) and (176), respectively, they are combined horizontally by an adder (178). In this manner, the HD image signal is reconstructed by vertical and horizontal band-combining operation performed by the sub-band combining circuit (180). The SD image is restored from the LL component.

The number of band divisions in the above-mentioned example is 4. When the number of band divisions is to be 5 or more, respective band signals or the LL signal is processed repeatedly in the manner shown in FIG. 2.

On the other hand, the so-called MPEG-1 and MPEG-2 are methods for compressing image information utilizing correlation between image frames and correlation between pixels in a frame, respectively. For example, Yonemitsu et al., "MPEG Standard Proposal, Video Part (ISO 11172 VIDEO)," *The Journal of Image Electronics Society*, 20.4, pp. 306–316, August 1991, discloses MPEG-1, and Watanabe et al., "MPEG2 Interframe Predict System," *The Television Society Technical Report*, ICS'92-73, October 1992, discloses MPEG-2.

The above two articles relate to techniques for compressing image information by performing a motion compensation interframe prediction coding utilizing correlation between image frames, that is, correlation in time direction. That is, as shown in FIG. 4, a series of frame images which are continuous in time is classified into three picture types: (1) I picture for intra-frame coding, (2) P picture to be prediction-coded from an I or P picture in a past frame for motion compensation, and (3) B picture to be prediction-coded from I or P pictures in past and future frames for motion compensation.

P or B picture in a current frame is divided into macro blocks, each of m horizontal pixels×n vertical pixels. On the other hand, I or P picture of a reference frame is also block-divided and a motion vector is obtained between the current frame and the reference frame. A difference value, prediction error, is obtained every pixel between blocks of proximate images by utilizing the motion vector thus detected. When the difference is too large, the motion compensation is not performed and, instead, an original pixel value of the macro block in the current frame is selected.

The difference value or the pixel value is intra-frame coded by such as DCT (Discrete Cosine Transformation). The intra-frame coding is also performed for all blocks in the I picture and blocks called intrablocks to which the motion compensation prediction is not performed.

A compression of the amount of information to be done by combining the above-mentioned motion compensation prediction coding is also considered in the image signal coding by which compatibility is provided between the HD image and the SD image. Prior art of such compression method is disclosed in Yukizawa and Watanabe, "Frequency Domain Realization of Motion Compensated Interframe Prediction for Sub-band/Transform Coding," *The Electronic Information and Communications Society*, Technical Report, IE-91-82, 1991-11.

In this article, an HD image is divided into a plurality of sub-bands as shown in FIG. 3. Among the divided band signals, an LL band signal corresponds to the SD image. When a P picture is to be coded, a past I or P picture is also divided into sub-bands.

Then, a motion compensation prediction of the LL band signal of the P picture is performed from the LL band of the past I or P picture. A difference resulting from the prediction is coded by using a suitable method such as DCT.

Then, a motion compensation prediction of the LH band signal of the P picture is performed from the LH band of the past I or P picture. In this case, it is possible to use the motion vector of the block which is obtained for the LL band signal as the motion vector. This is because a certain block in the LH band signal and a block in the LL band signal, which corresponds to such certain block, are band-divided signals in the same position of the image and considered as having similar motion vectors.

Therefore, the motion compensation prediction of the block in the LH band signal is performed by using the motion vector obtained for the block in the LL band signal as it is or searching a relatively small range around the motion vector. The difference resulting from the prediction is similarly coded by using a suitable method such as DCT. The same processing of the LH band signal is performed for the HL and HH band signals.

For the I picture, intra-frame compression is performed for every sub-band divided band signal.

In the method in which the motion compensation is performed after the sub-band division, however, the coding efficiency is not as high as pointed out in the above-mentioned articles. This is because the respective band signals obtained by sub-band division are sub-sampled signals. That is, since the frequencies of the LH, HL, and HH band signals are high, the signal values at the sub-sampling points become different between the current frame and the reference frame and the correlation is not always high. Therefore, the difference between macro blocks of the current and the reference frames does not become small, and thus the code amount is not reduced as expected.

BRIEF SUMMARY OF THE INVENTION

An object of the present invention is to provide an image information compression and decompression device capable of improving the coding efficiency where a motion compensation prediction coding is performed after sub-band division.

Another object of the present invention is to improve the coding efficiency of a P or B picture.

A further object of the present invention is to improve the coding efficiency of an I picture.

Another object of the present invention is to reduce the amount of operation in an image information compression and decompression device and to simplify the circuit construction of the device.

Another object of the present invention is to provide an image information compression device for compressing an image information by performing a motion compensation prediction coding by sub-band division of an image signal, comprising sub-band dividing means for sub-band dividing an image signal corresponding to a unit of image into a plurality of band signals, including a low frequency band signal, sub-band combining means for sub-band combining the plurality of band signals obtained from the sub-band dividing means and obtaining a combined high frequency band signal having the same number of pixels as that of the image signal and having the plurality of band signals, excluding the low frequency band signal, and motion compensation coding means for performing motion compensation coding for both the low frequency band signal obtained by the sub-band dividing means and the combined high frequency band signal obtained by the sub-band combining means.

Another object of the present invention is to provide the above-mentioned image information compression device, wherein the sub-band dividing means comprises a first sub-band dividing means for obtaining, from the image signal, a plurality of band signals including a first low frequency band signal and a second sub-band dividing means for deriving a second low frequency band signal from the image signal, and wherein the sub-band combining means comprises a first sub-band combining means for obtaining a first combined high frequency band signal by sub-band combining the plurality of band signals obtained by the first sub-band dividing means, excluding the first low frequency band signal, and a second sub-band combining means for sub-band combining the second low frequency band signal derived from the second sub-band dividing means and obtaining a second combined high frequency band signal by subtracting the sub-band combined second low frequency band signal from the image signal.

Another object of the present invention is to provide the above-mentioned image information compression device, wherein the motion compensation coding means comprises first motion compensation coding means for performing a motion compensation coding on the basis of the first low frequency band signal obtained by the first sub-band dividing means and the second low frequency band signal obtained by the second sub-band dividing means, and second motion compensation coding means for performing a motion compensation coding on the basis of the first combined high frequency band signal obtained by the first sub-band combining means and the second combined high frequency band signal obtained by the second sub-band combining means.

Another object of the present invention is to provide the above-mentioned image information compression device, wherein the first motion compensation coding means comprises first motion vector detection means for detecting a first motion vector between the first low frequency band signal and the second low frequency band signal, and first motion compensation means for outputting a motion-compensated low frequency band signal by predicting the second low frequency band signal on the basis of the first motion vector and the first low frequency band signal, and wherein the second motion compensation coding means comprises second motion vector detection means for detecting a second motion vector between the first combined high frequency band signal and the second combined high frequency band signal, on the basis of the first combined high frequency band signal, the second combined high frequency band signal, and the first motion vector, and second motion compensation means for outputting a motion-compensated high frequency band signal by predicting the second combined high frequency band signal on the basis of the second motion vector and the first combined high frequency band signal.

Another object of the present invention is to provide an image information decompression device for expanding an image information, including a low frequency band signal obtained by sub-band division of an image signal of an image corresponding to one unit and a combined high frequency band signal obtained by band-combining a plurality of band signals obtained by the sub-band division, excluding the low frequency band signal, and having the same number of pixels as that of the image signal, the low frequency band signal, and the combined high frequency band signal being compressed by motion compensation coding, the image information decompression device comprising motion compensation decoding means for decoding motion compensation of the compressed low frequency band signal and the compressed combined high frequency band signal, and outputting a decoded low frequency band signal and a decoded combined high frequency signal, and third sub-band combining means for sub-band combining the decoded low frequency band signal and the decoded combined high frequency band signal from the motion compensation decoding means and obtaining a decoded image signal.

Another object of the present invention is to provide the above-mentioned image information decompression device, further comprising intra-plane decoding means for intra-plane decoding the plurality of intra-plane decoded band signals and outputting a plurality of decoded band signals, and fourth sub-band combining means for sub-band combining the plurality of the decoded band signals from the intra-plane decoding means.

DETAILED DESCRIPTION OF THE INVENTION

An embodiment of an image information compression and decompression device according to the present invention will be described in detail with reference to the accompanying drawings.

Whole Construction of a Compression Device

Figure 1:
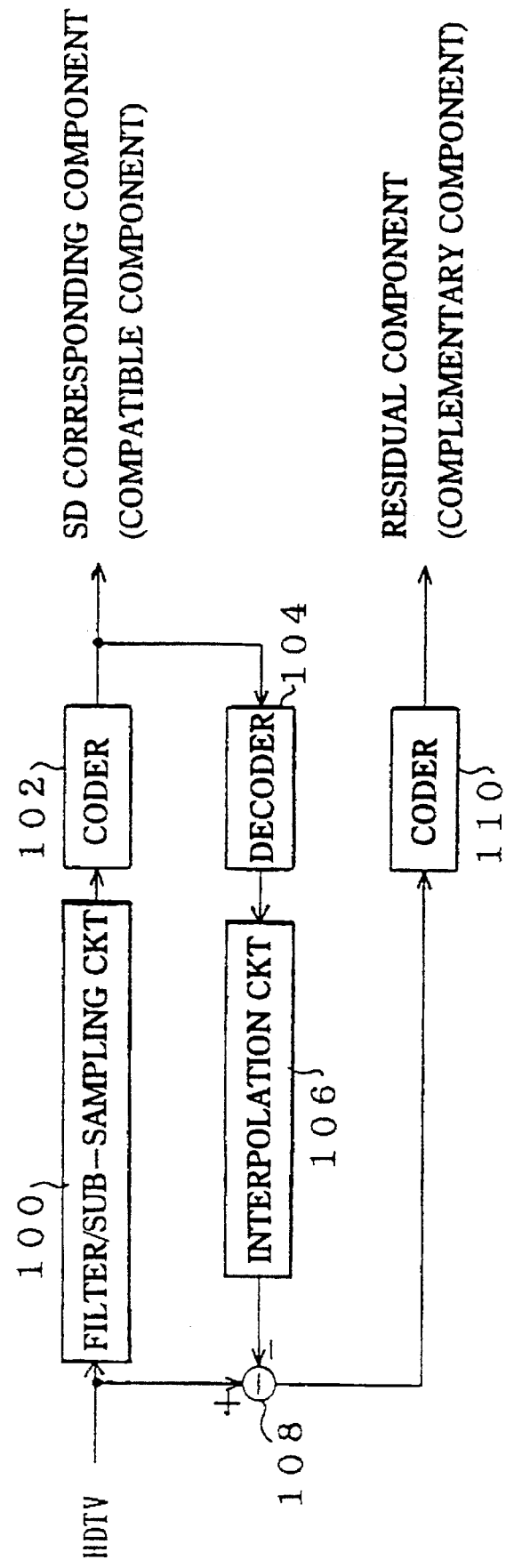
FIG. 1 is a block diagram showing an example of a conventional image compression device.
Figure 2:
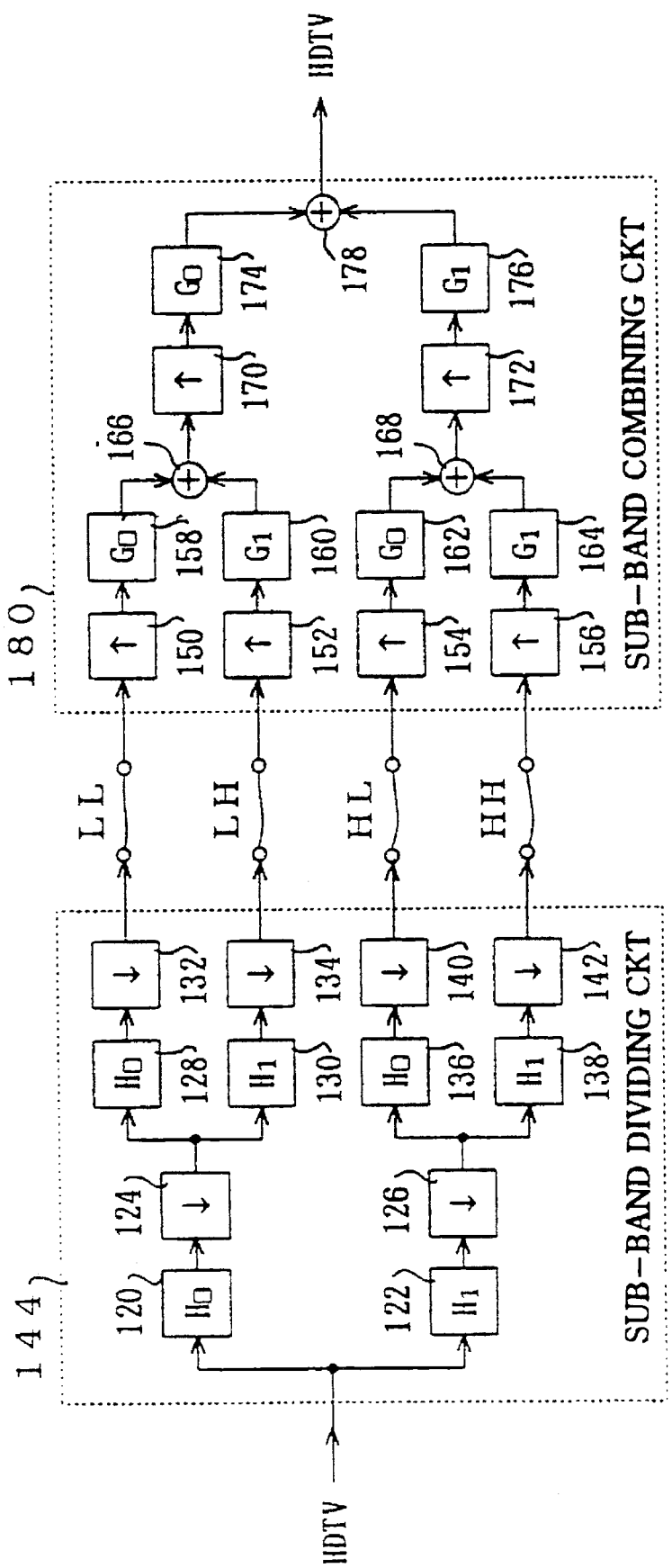
FIG. 2 is a block diagram showing an example of a sub-band division circuit and a sub-band combining circuit.
Figure 5:
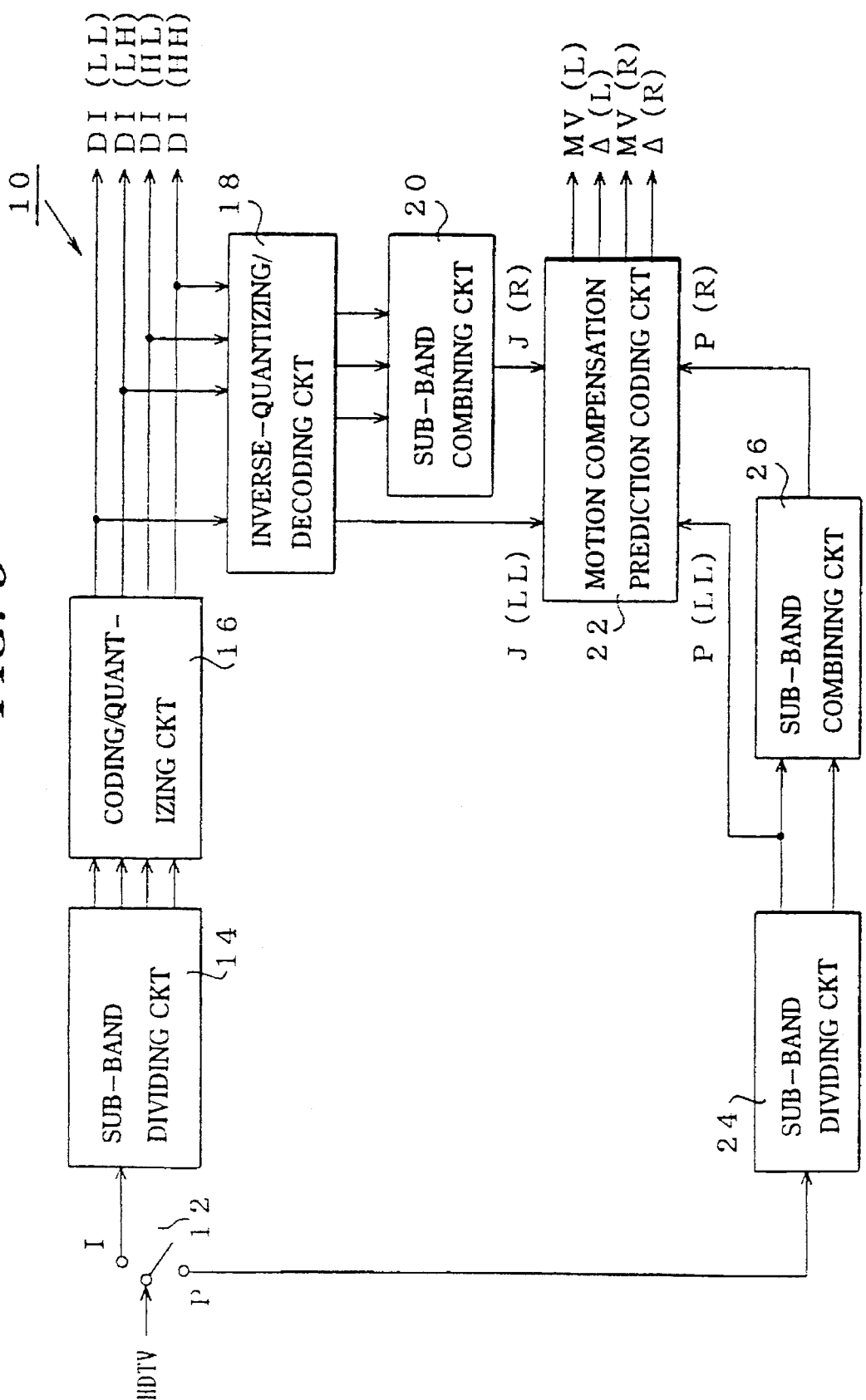
FIG. 5 is a block diagram showing the whole construction of a compression device of an image information compression and decompression device according to an embodiment of the present invention.

First, the whole construction of an image information compression device (10) will be described with reference to FIG. 5. In FIG. 5, a digitized HDTV image signal is supplied to a tun-over switch (12) to distinguish an I picture from a P picture. The I picture is divided by a sub-band dividing circuit (14) (see FIG. 2) into band signals I(LL), I(LH), I(HL), and I(HH) of LL, LH, HL, and HH, shown in FIG. 3.

These band signals are supplied to a coding/quantizing circuit (16) and coded/quantized thereby, respectively. The I picture is intra-frame (intra-plane) compressed every sub-band divided image signal in this manner and respective compressed band signals DI(LL), DI(LH), DI(HL), and DI(HH) are obtained from the coding/quantizing circuit (16).

Thereafter, these compressed signals are supplied to an inverse-quantizing/decoding circuit (18) in which they are processed in the reverse manner to the coding/quantizing circuit (16). That is, they are locally decoded. With this scheme, the decoded signals J(LL), J(LH), J(HL), and J(HH) of the respective sub-band divided band signals are obtained while avoiding the accumulation of quantization error between frames.

Among the decoded signals of the respective bands, the high frequency signals J(LH), J(HL), and J(HH) are band-combined in a sub-band combining circuit (20), resulting in a combined signal J(R). The combined signal J(R) and the low frequency band signal J(LL) are supplied to a motion compensation prediction coding circuit (22).

On the other hand, the P picture from the tun-over switch (12) is supplied to a sub-band dividing circuit (24). The sub-band dividing circuit (24) divides the P picture into sub-band signals from which a low frequency band signal P(LL) is derived. A sub-band combining circuit (26) performs a sub-band combination for the low frequency band signal P(LL) from the sub-band dividing circuit (24) and subtracts the sub-band combined low frequency band signal P(LL) from the image signal of the P picture, resulting in a combined high frequency band signal P(R), which is equivalent to combined high frequency band components P(LH), P(HL), and P(HH) of the P picture. The combined high frequency band signal P(R) and the low frequency band signal P(LL) are supplied to the motion compensation prediction coding circuit (22).

As mentioned, the motion compensation prediction coding circuit (22) is supplied with (1) the low frequency band signal J(LL) of the I picture, which is locally decoded, (2) the combined high frequency band signal J(R) of the I picture, which is locally decoded, (3) the low frequency band signal P(LL) of the P picture, and (4) the combined high frequency band signal P(R) of the P picture.

The motion compensation prediction coding circuit (22) performs a processing of motion compensation prediction coding with respect to the P picture on the basis of these signals J(LL), J(R), P(LL), and P(R). That is, a motion vector MV(L) of the low frequency component and a difference value Δ(L) between the low frequency band signals are obtained on the basis of the low frequency band signals J(LL) and P(LL). Further, a motion vector MV(R) of the high frequency component and a difference value Δ(R) between the high frequency band signals are obtained on the basis of the high frequency band signals J(R) and P(R). As the motion vector MV(R) of the high frequency component, a difference vector between the motion vectors obtained for the low frequency component and the high frequency component is used.

As mentioned above, for the I picture, the compression is performed for every divided sub-band. On the other hand, a motion compensation prediction coding is performed between the low frequency component P(LL) of the P picture and the low frequency component J(LL) of the I picture (or P picture). Further, a motion compensation prediction coding is performed between the combined high frequency component P(R) and the combined high frequency component J(R) of the I picture (or P picture) by utilizing the motion vector obtained for the low frequency components.

That is, in the previously mentioned prior art, the motion compensation prediction coding is performed for every sub-band component, including the high frequency component. On the other hand, according to this embodiment, the motion compensation prediction coding is performed for the combined high frequency components, excluding the low frequency component.

Detailed Construction of the Compression Device

Figure 6:
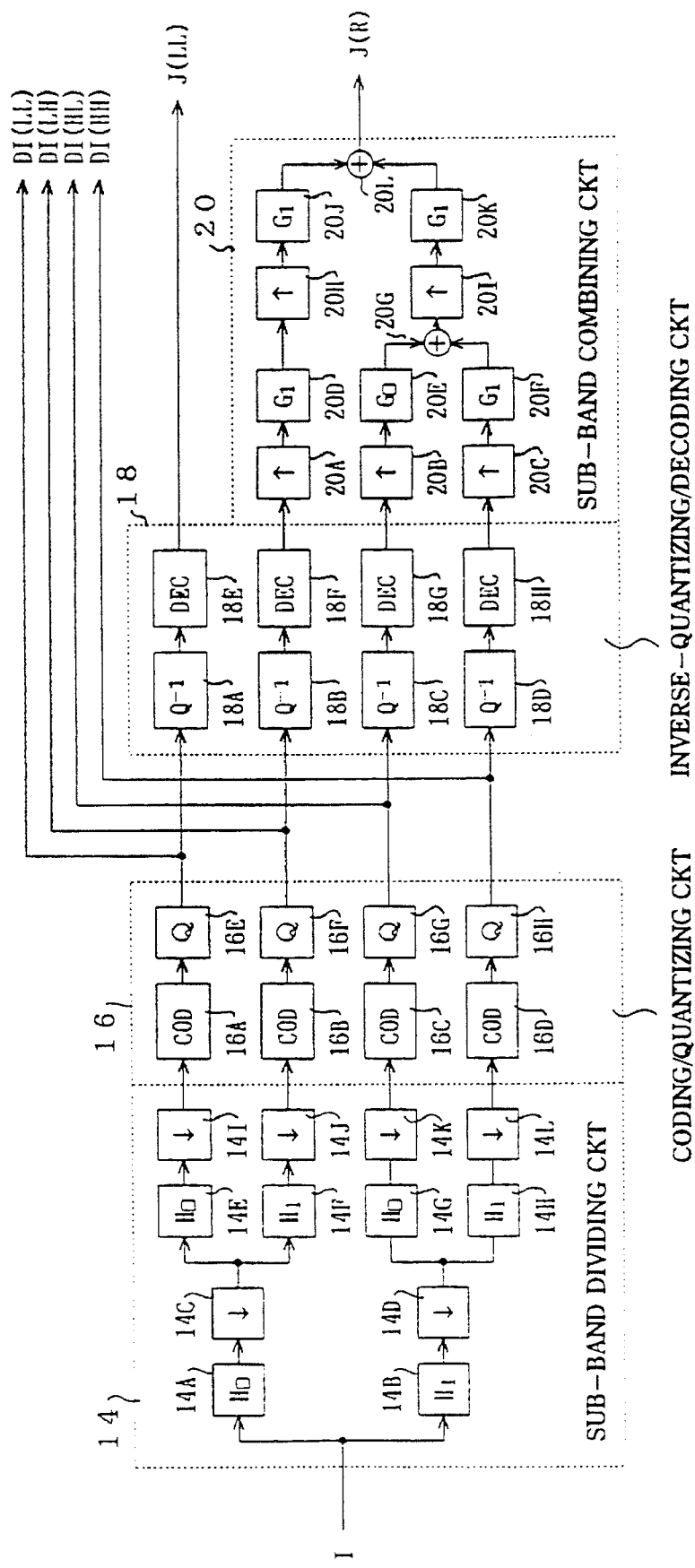
FIG. 6 is a block diagram showing the construction of a portion of the compression device shown in FIG. 5, in detail.

Respective portions of the image information compression device mentioned above will now be described in more detail. FIG. 6 shows a processing circuit for the I picture. In FIG. 6, the sub-band dividing circuit (14) includes horizontal sub-band analysis filters (14A and 14B), sub-sampling circuits (14C and 14D), vertical sub-band analysis filters (14E, 14F, 14G, and 14H), and sub-sampling circuits (14I, 14J, 14K, and 14L).

With these constructive components, one frame (or one field) of the HD image of the I picture is divided into sub-bands and sub-sampled (for example, sub-sampled at a ratio of 2:1 in horizontal and vertical direction), resulting in the sub-band signals I(LL), I(LH), I(HL), and I(HH).

The coding/quantizing circuit (16) is composed of coding circuits (16A, 16B, 16C, and 16D) and quantizers (16E, 16F, 16G, and 16H). The respective sub-band signals I(LL), I(LH), I(HL), and I(HH) from the sub-band dividing circuit (14) are coded by the respective coders (16A–16D) by using DCT or differential pulse code modulation (DPCM), and further quantized again by the respective quantizers (16E–16H), resulting in the compressed signals DI(LL), DI(LH), DI(HL), and DI(HH) of the respective bands. These compressed image signals are outputted, together with the motion compensation prediction coded, compressed image information, to a transmission line or a recording medium which is not shown.

The inverse-quantizing/decoding circuit (18) is composed of inverse-quantizers (18A, 18B, 18C, and 18D) and decoders (18E, 18F, 18G, and 18H). The compressed signals DI(LL), DI(LH), DI(HL), and DI(HH) of the respective bands output from the coding/quantizing circuit (16) are, respectively, inverse-quantized by the inverse-quantizers (18A–18D) and further decoded by the decoders (18E–18H). Thus, the locally decoded signals J(LL), J(LH), J(HL), and J(HH) of the respective bands are obtained.

The sub-band combining circuit (20) is composed of vertical interpolation circuits (20A, 20B, and 20C), sub-band synthesis filters (20D, 20E, and 20F), an adder (20G), horizontal interpolation circuits (20H and 20I), sub-band synthesis filters (20J and 20K), and an adder (20L). The low frequency band signal J(LL) of the decoded signals J(LL), J(LH), J(HL), and J(HH) from the inverse-quantizing/ decoding circuit (18) is supplied to the motion compensation prediction coding circuit (22) as is.

For the remaining high frequency band signals J(LH), J(HL), and J(HH), however, they are interpolated at a ratio of, for example, 1:2 in horizontal and vertical direction (inserting a value "0" to every interval successive samples) by the sub-band combining circuit (20) and band-combined. As a result, the combined high frequency band signal J(R) is output from the sub-band combining circuit (20). Then, the combined high frequency band signal J(R) is supplied to the motion compensation prediction coding circuit (22).

The combined high frequency band signal J(R) from the sub-band combining circuit (20) corresponds to an image signal which is sub-band combined with all LL signals being "0" and is the HD image signal reduced by the LL component. Therefore, the number of pixels thereof is equal to that of the HD image of the I picture, which is the input of the sub-band dividing circuit (14).

Figure 7:
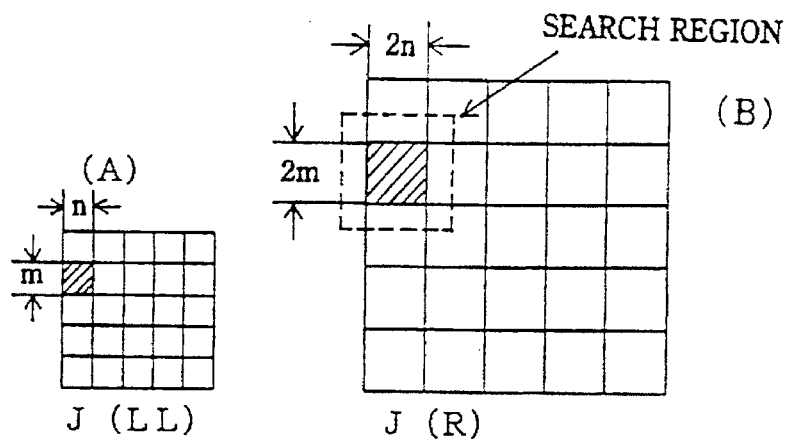
FIG. 7 is a view showing the relationship between a low frequency band signal and a high frequency band signal decoded by the device shown in FIG. 6 and pixel number.

FIG. 7 shows the correspondence between the low frequency band signal J(LL) and the combined high frequency band signal J(R). Since the low frequency band signal J(LL), shown in FIG. 7(A), is sub-sampled at 2:1 in vertical or horizontal direction by the sub-band dividing circuit (14), the number of pixels thereof is one-fourth that of the original image. On the other hand, since the combined high frequency band signal J(R), shown in FIG. 7(B), is interpolated at 1:2 in horizontal and vertical direction by the sub-band combining circuit (20), the number of pixels thereof is equal to that of the original image.

Figure 8:
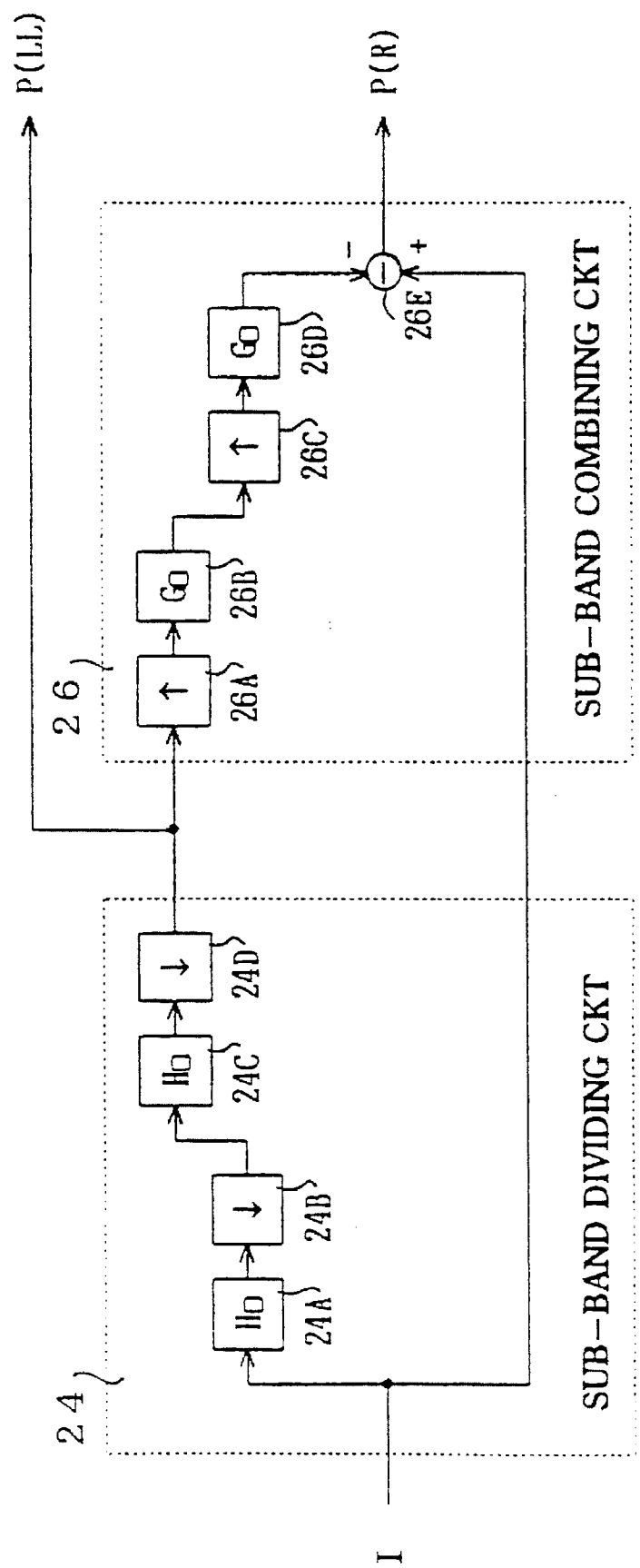
FIG. 8 is a block diagram showing the construction of a portion of the compression device shown in FIG. 6, in detail.

Now, the processing circuit for the P picture will be described with reference to FIG. 8. In FIG. 8, the sub-band dividing circuit (24) is composed of a horizontal sub-band analysis filter (24A), a sub-sampling circuit (24B), a vertical sub-band analysis filter (24C), and a sub-sampling circuit (24D), with which the HD image of the P picture is sub-band divided and sub-sampled in horizontal and vertical directions, resulting in the low frequency band signal P(LL).

The sub-band combining circuit (26) is composed of a vertical interpolation circuit (26A), a sub-band synthesis filter (26B), a horizontal interpolation circuit (26C), a sub-band synthesis filter (26D), and a subtracter (26E), with which the low frequency band signal P(LL) is interpolated in horizontal and vertical directions and sub-band combined. The number of pixels of the output of the sub-band synthesis filter (26D) is equal to that of the input HD signal since it is interpolated, and it is subtracted from the input HD signal, every pixel, by the subtracter (26E). Therefore, the combined high frequency band signal P(R) of the P picture is ultimately obtained.

This processing circuit for the P picture can be realized by the construction shown in FIG. 6 with the coding/quantizing circuit (16) and the inverse-quantizing/decoding circuit (18) being removed. That is, it can be realized by the sub-band dividing circuit (14) and the sub-band combining circuit (20). However, by using the circuit construction shown in FIG. 8, it is possible to reduce the amount of arithmetic operation required for the filtering operation.

Now, the motion compensation prediction coding circuit (22) of FIG. 5 will be described with reference to FIG. 9. In an upper portion of the motion compensation prediction coding circuit (22), shown in FIG. 9, a motion compensation prediction coding is performed for the LL band signal P(LL)

of the P picture with reference to the locally decoded LL band signal J(LL) of the I picture. Further, in a lower portion of the motion compensation prediction coding circuit (22), shown in FIG. 9, a motion compensation prediction coding is performed for the combined high frequency band signal P(R) of the P picture utilizing the motion vector obtained in the low frequency side, with reference to the combined high frequency band signal J(R) of the I picture.

Describing the low frequency side first, the LL band signal P(LL) of the P picture is supplied to a motion vector estimation circuit (22A). The LL band signal J(LL) of the I picture is supplied to the motion vector estimation circuit (22A) through a fixed contact (a) of a switch (SW3). In the motion vector estimation circuit (22A), the LL band signals of the respective pictures are divided into blocks, each of n vertical pixels×n horizontal pixels and motion vectors thereof are searched by comparing them block by block. As a result, an optimum motion vector in the searched range is detected and sent to a motion compensation circuit (22B).

In the motion compensation circuit (22B), the pixel value of the LL band signal J(LL) of the I picture corresponding to the motion vector is obtained and output to a subtracter (22C). In the subtracter (22C), the pixel value of the LL band signal P(LL) of the P picture is subtracted from the output signal of the motion compensation circuit (22B), resulting in a difference value. The difference value thus obtained is information-compressed by coding processing such as DCT or DPCM coding by a coder (22D) and re-quantizing processing by a quantizer (22E), and transmitted or recorded as the difference value Δ(L) of the low frequency band signal of the P picture, after suitable coding. In this case, the motion vector MV(L) of the low frequency band signal detected by the motion vector estimation circuit (22A) is also output.

Figure 9:
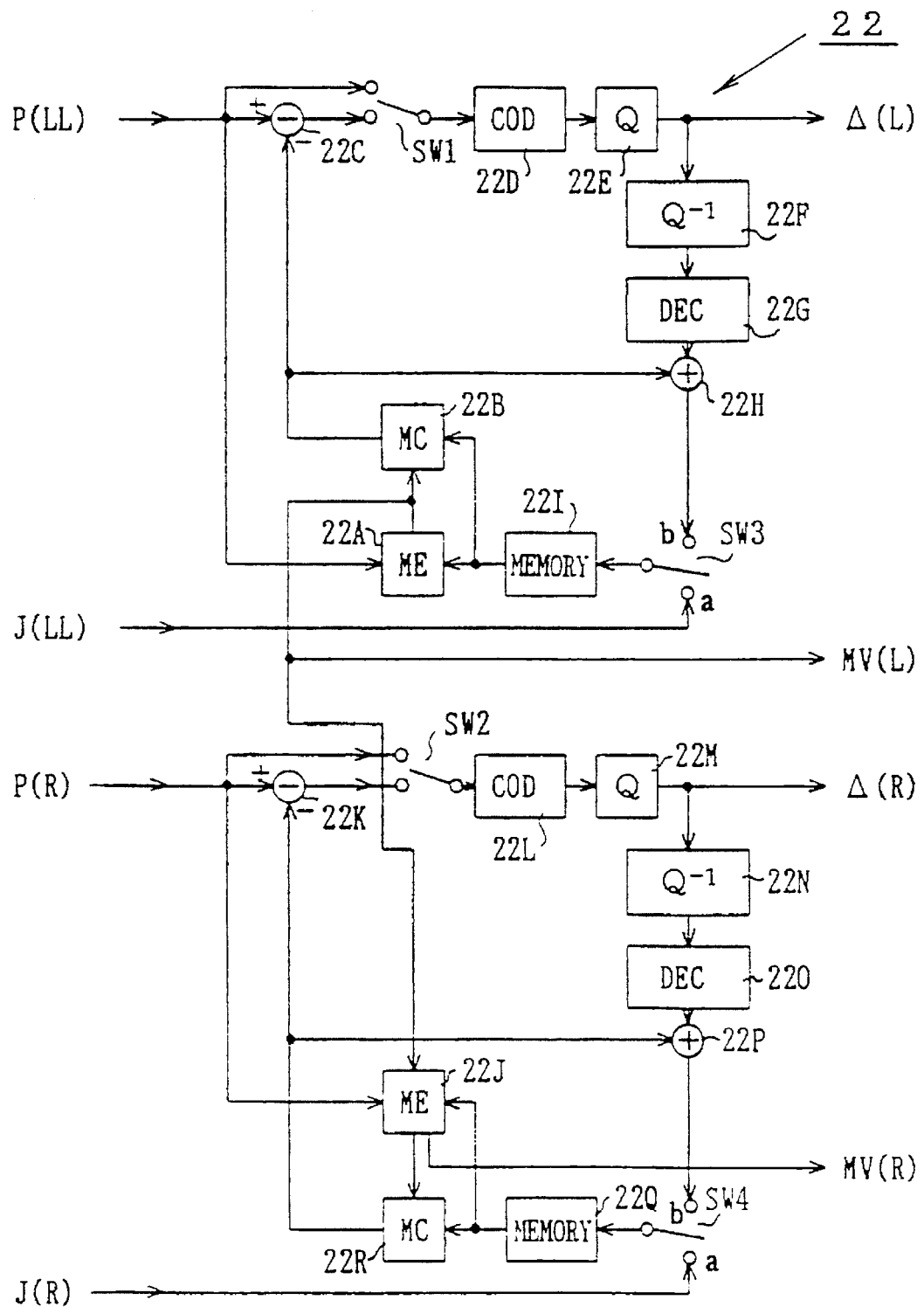
FIG. 9 is a block diagram showing the construction of another portion of the compression device shown in FIG. 6, in detail.

A purpose of a switch (SW1), shown in FIG. 9, is to perform an intra/inter-adaptive prediction for selecting the difference value of motion compensation and the pixel value of a current image, every block. An inverse-quantizer (22F), a decoder (22G), and an adder (22H) function to locally decode the LL band signal P(LL) of the P picture from the difference value. Where P pictures are successive, LL band signals P(LL) of the P pictures which are locally decoded are supplied to a memory (22I) by switching a movable contact of the switch (SW3) to the side of a fixed contact (b). The motion compensation prediction coding is performed between the P pictures by outputting the stored signal with a delay of one frame. It may be possible to perform the motion compensation prediction every ½ pixel, in which case, an average of the pixel values of, for example, the I picture is subtracted by the subtracter (22C).

Now, the operation on the side of the high frequency component will be described. Although it is basically similar to that in the low frequency side, reduction of the amount of operation for the motion vector search and reduction of the coding amount of the motion vector are realized by utilizing the motion vector obtained on the low frequency side. In order to realize these reductions, the combined high frequency band signal is divided into blocks, each of 2 m vertical pixels×2 n horizontal pixels, as shown in FIG. 7(B), corresponding to the LL band signals.

A motion vector estimation circuit (22J) searches the motion vector between the combined high frequency band signal J(R) of the I picture and the combined high frequency band signal P(R) of the P picture every block. This search is performed in a relatively small region (for example, see an area defined by a dotted line in FIG. 7), with a pixel indicated by a vector which is twice the motion vector of a block of the corresponding LL band signal in horizontal and vertical directions as a center. Subsequent processing is similar to that in the low frequency side and a difference value Δ(R) of the combined high frequency band signal and a motion vector MV(R) are output. As the motion vector MV(R), a difference vector between vectors which are twice the corresponding low frequency side motion vector MV(L) in horizontal and vertical directions is coded and transmitted as MV(R).

Whole Construction of the Decompression Device

Figure 10:
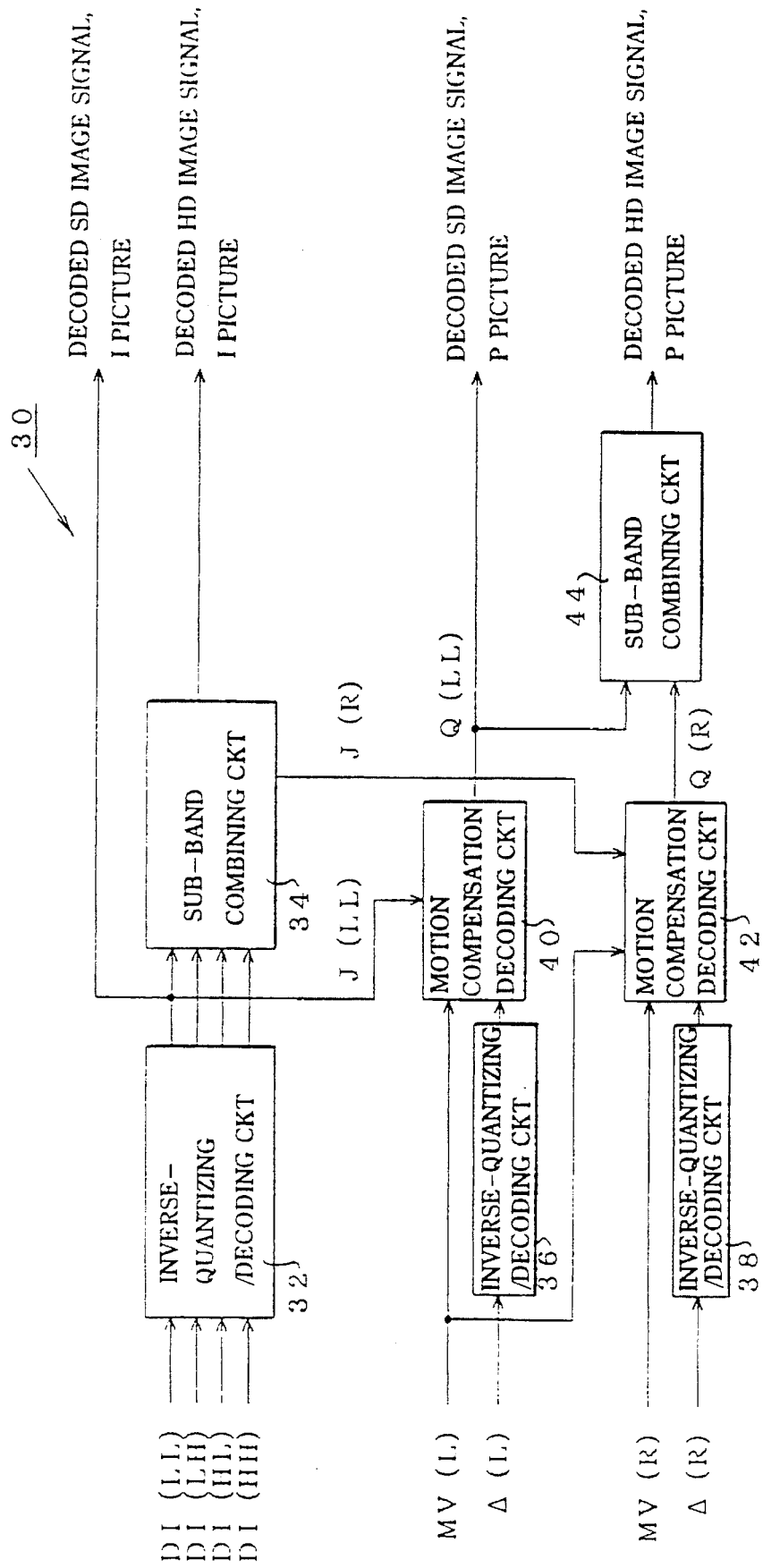
FIG. 10 is a block diagram showing the whole construction of a decompression device of an image information compression and decompression device according to an embodiment of the present invention.

A whole construction of the image information decompression device (30) of the image information compression and decompression device, according to an embodiment of the present invention, will be described with reference to FIG. 10. The image information decompression device (30) performs a reverse processing to the compression processing performed in the compression device (10), shown in FIG. 5. In FIG. 10, the compressed signals DI(LL), DI(LH), DI(HL), and DI(HH) of the respective bands of the I picture supplied from the compression device (10) through a transmission line (which is not shown) or reproduced by and supplied from a recording device. These compressed signals DI(LL), DI(LH), DI(HL), and DI(HH) are supplied to an inverse-quantizing/decoding circuit (32) and inverse-quantized and decoded thereby.

Among the band signals J(LL), J(LH), J(HL), and J(HH) decoded by the inverse-quantizing/decoding circuit (32), the band signal J(LL) becomes a decoded SD image signal of the I picture. Further, the decoded band signals J(LL), J(LH), J(HL), and J(HH) are combined horizontally and vertically by a sub-band combining circuit (34), resulting in a decoded HD image signal of the I picture.

On the other hand, for the P picture, the difference values Δ(L) and Δ(R) of the low and high frequency sides, which are obtained by the motion compensation prediction coding, are, respectively, inverse-quantized and decoded by inverse-quantizing/decoding circuits (36 and 38), and supplied to motion compensation decoding circuits (40 and 42), respectively. The motion compensation decoding circuit (40) of the low frequency side is further supplied with the decoded LL band signal J(LL) of the I picture and the motion vector MV(L) of the low frequency band signal and outputs an LL band signal Q(LL) of the P picture which becomes a decoded SD image signal of the P picture.

The motion compensation decoding circuit (42) of the high frequency side is further supplied with the decoded combined high frequency signal J(R) of the I picture, the motion vector MV(L) of the low frequency signal, and the motion vector MV(R) of the high frequency signal, and outputs a combined high frequency band signal Q(R) of the P picture. A decoded HD image signal of the P picture is obtained by combining the outputs of the motion compensation decoding circuits (40) and (42) in a sub-band combining circuit (44).

Detailed Construction of the Decompression Device

Figure 11:
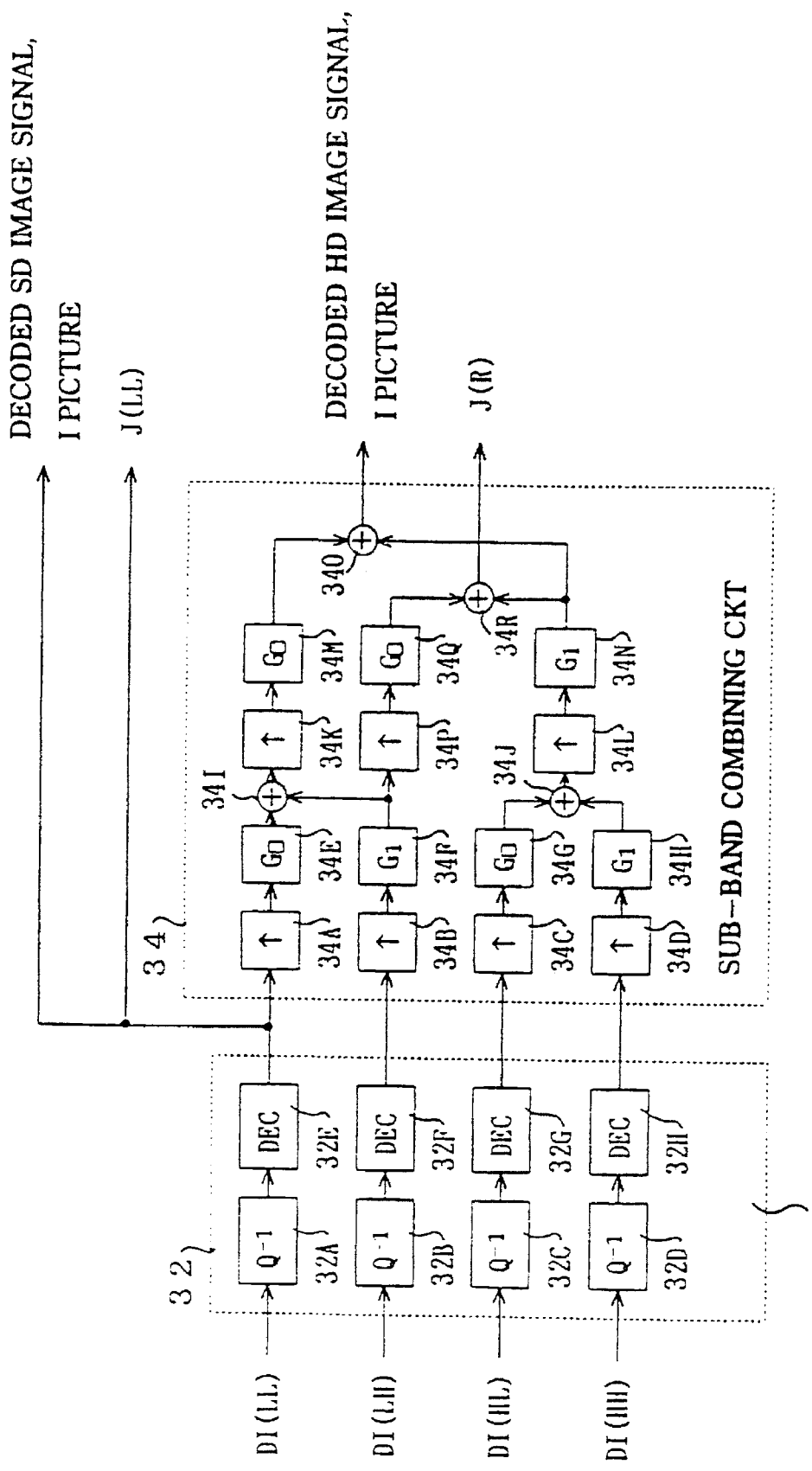
FIG. 11 is a block diagram showing the detailed construction of a portion of the decompression device shown in FIG. 10.

The respective portions of the image information decompression device mentioned above will be described in detail with reference to FIGS. 11 and 12. In FIG. 11, the inverse-quantizing/decoding circuit (32) is composed of inverse-quantizers (32A, 32B, 32C, and 32D) and decoders (32E, 32F, 32G, and 32H). The compressed signal DI(LL), DI(LH), DI(HL), and DI(HH) of the respective bands are supplied from the compression device through a transmission line (which is not shown) or reproduced by and supplied from a recording device.

The compressed signals DI(LL), DI(LH), DI(HL), and DI(HH) of the respective bands of the I picture are inverse-quantized by the inverse-quantizers (32A–32D) and then, respectively, decoded by the decoders (32E–32H). In the inverse-quantizers (32A–32D), the inverse-quantizing processing to that in the re-quantizers (16E–16H), shown in FIG. 6, are performed and, in the decoders (32E–32H), the decoding processing which is inverse to that performed in the coders (16A–16D), shown in FIG. 6 is performed, resulting in the decoded signals J(LL), J(LH), J(HL), and J(HH) of the respective bands. The low frequency decoded signal J(LL), among others, becomes the decoded SD image signal of the I picture.

In the sub-band combining circuit (34), the vertical interpolation and combining are performed by interpolation circuits (34A, 34B, 34C, and 34D), sub-band synthesis filters (34E, 34F, 34G, and 34H), and adders (34I and 34J). Further, the horizontal interpolation and combining are performed by interpolation circuits (34K and 34L), sub-band synthesis filters (34M and 34N), and an adder (34O).

With this circuit construction, the decoded HD image signal of the I picture is obtained from the decoded signals J(LL), J(LH), J(HL), and J(HH). The high frequency band components, that is, the band signals J(LH), J(HL), and J(HH), are combined by interpolation circuits 34L and 34P, sub-band synthesis filters (34N and 34Q), and an adder (34R), resulting in the combined high frequency band signal J(R). The J(R) signal is supplied, together with the J(LL) signal to the processing circuit for the P picture shown in FIG. 12.

Figure 12:
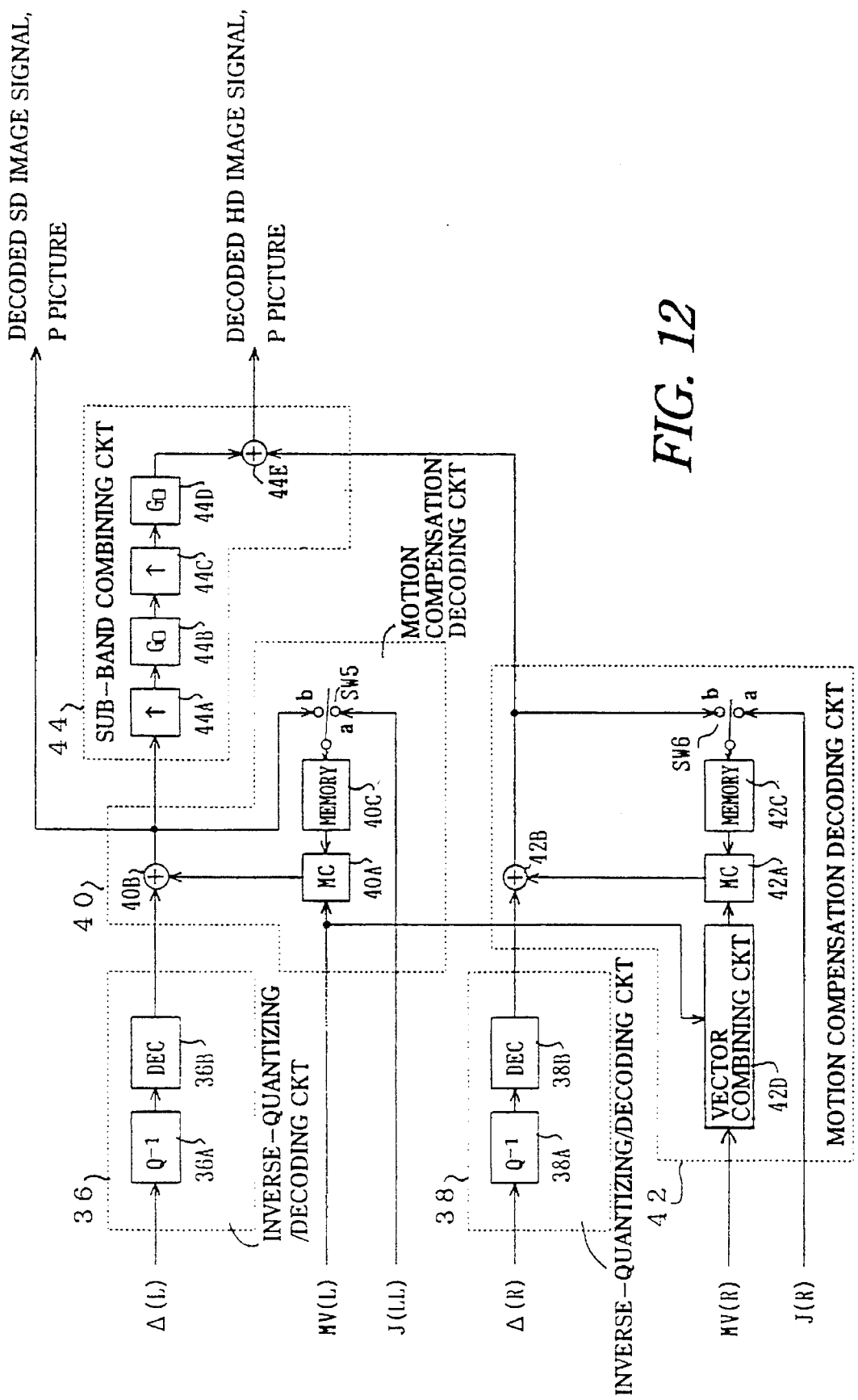
FIG. 12 is a block diagram showing the construction of another portion of the decompression device shown in FIG. 10, in detail.

In FIG. 12, an inverse-quantizing/decoding circuit (36) is composed of an inverse/quantizer (36A) and a decoder (36B), by which the inverse-quantization and decoding of the difference value Δ(L) of the low frequency side are performed. In the inverse-quantizer (36A), an inverse processing to that performed in the quantizer (22E) (see FIG. 9) is performed and, in the decoder (36B), an inverse processing to that performed in the coder (22D) (see FIG. 9) is performed.

The inverse-quantizing/decoding circuit (38) is composed of an inverse/quantizer (38A) and a decoder (38B), by which the inverse-quantization and decoding of the difference value Δ(R) of the high frequency side are performed. In the inverse-quantizer (38A), an inverse processing to that performed in the re-quantizer (22M) (see FIG. 9) is performed and, in the decoder (38B), an inverse processing to that performed in the coder (22L) (see FIG. 9) is performed.

The motion compensation decoding circuit (40) is composed of a motion compensation circuit (40A), an adder (40B), a switch (SW5), and a memory (40C). In the motion compensation circuit (40A), the motion compensation is performed on the basis of the motion vector MV(L) of the low frequency side and an image signal of a preceding frame, which is supplied from the memory (40C). The result is added to the decoded difference value Δ(L) in the adder (40B) and the motion-compensated, predicted image is recovered.

Since, when the preceding frame is an I picture, the low frequency, decoded signal J(LL) is input from the circuit shown in FIG. 11 to the fixed contact (a) of the switch (SW5), the switch (SW5) supplies it to the memory (40C). When the preceding frame is a P picture, the switch (SW5) supplies the low frequency, decoded signal Q(LL) supplied to its fixed contact (b) from the adder (40B) to the memory (40C). The signal stored in the memory (40C) is output with a delay corresponding to one frame (or one field). The output of the adder (40B) becomes the decoded SD image signal of the P picture.

The motion compensation decoding circuit (42) is composed of a motion compensation circuit (42A), an adder (42B), a switch (SW6), a memory (42C), and a vector-combining circuit (42D), from which a high frequency motion vector is obtained, which is a combination of a motion vector of high frequency band whose vertical and horizontal values are made twice those of the motion vector MV(L) of low frequency band, respectively, and the motion vector MV(R) of high frequency band difference. The vertical and horizontal values of the low frequency band motion vector are made twice those of the motion vector MV(L) of low frequency band due to the relation in pixel number between the low frequency band decoded signal J(LL) and the high frequency band combined signal J(R).

In the motion compensation circuit (42A), a motion compensation is performed on the basis of the combined motion vector and the image signal of the preceding frame supplied from the memory (42C), and a result of compensation is added to the decoded difference value Δ(R) by the adder (42B) to restore a motion-compensated image. When the preceding frame is an I picture, the combined high frequency band signal J(R) input from the circuit shown in FIG. 11 to a fixed contact (a) of the switch (SW6) is supplied to the memory (42C). When it is a P picture, the decoded, combined high frequency band signal Q(R) of the P picture which is input from the adder (42B) to a fixed contact (b) of the switch (SW6) is supplied to the memory (42C). The signal stored in the memory (42C) is output, with a delay of one frame (or one field).

The sub-band combining circuit (44) is composed of a vertical interpolation circuit (44A), a sub-band synthesis filter (44B), a horizontal interpolation circuit (44C), a sub-band synthesis filter (44D), and an adder (44E). In a circuit from the interpolation circuit (44A) to the sub-band synthesis filter (44D), a sub-band synthesis of the low frequency, decoded signal Q(LL) obtained in the motion compensation decoding circuit (40) is performed, and an output of the sub-band synthesis filter (44D) is added to the decoded high frequency band signal Q(R) by the adder (44E), resulting in the decoded HD image signal of the P picture.

Advantages of this embodiment are summarized below. (1) Among the respective band signals after the sub-band division, the high frequency band signals are combined and the resultant combined high frequency band signal is subjected to the interframe motion compensation prediction coding and decoding as a signal having the same number of pixels as that of the input image signal. Therefore, it is possible to improve the coding efficiency in the interframe prediction. (2) Unlike the ordinary pyramid coding, the combined high frequency band signal is composed of the band signals after sub-band division, excluding the low frequency band signal, and, for the I picture, it is enough to code every band signal just sub-band divided and transmit it. Therefore, it is possible to improve coding efficiency. (3) Since the combined high frequency band signal is obtained by subtracting the signal resulting from interpolation and filtering of only the low frequency band signal after being sub-band divided similarly to the case of the sub-band combining from the input signal before sub-band division, it is possible to reduce the amount of operation required to obtain the combined high frequency band signal.

Other Embodiments

It should be noted that the present invention is not limited to the embodiment described above. For example, the following cases fall within the scope of the present invention:

(1) Although the I picture and the P picture are handled in the described embodiment, the latter can be easily modified to include the B picture as the prediction structure as in MPEG-1.

(2) In the described embodiment, in order to avoid accumulation of quantization error of the decoded signal between frames, the accumulated quantization error between frames on the side of the coding device is cancelled out by the quantization error accumulated between frames on the side of the decoding device by performing the inverse-quantization and decoding processing in the coding device shown in FIGS. 6 and 9. However, when the number of P pictures is reduced by arranging an I picture every one or two frames, accumulation of quantization error, if any, is not considerable. Therefore, it may be possible to use a signal before re-quantization, instead of the outputs of the inverse-quantizing/decoding circuit (16), shown in FIG. 6, and the decoders (22G and 22O), shown in FIG. 9.

That is, in FIG. 6, the LL band signal I(LL) may be used instead of the low frequency band decoded signal J(LL), and a signal obtained by sub-band combining the band signals I(LH), I(HL), and I(HH) may be used instead of the combined high frequency band signal J(R). In such case, the inverse-quantizers (18A–18D) and the decoders (18E–18H) can be eliminated. Similarly, in FIG. 9, the inverse-quantizers (22F and 22N) and the decoders (22G and 22O) can be eliminated.

Further, in such case, the J(R) may be obtained not by sub-band combination of I(LH), I(HL), and I(HH) in FIG. 6, but by performing interpolation and filtering for I(HH), as shown in FIG. 8, and subtracting a result thereof from the input signal of the circuit shown in FIG. 6. In such case, it is possible to reduce the amount of operation.

Although the construction of the processing circuit on the side of the P picture, shown in FIG. 8, is similar to the construction of the previously mentioned pyramid coding device, they are different in that the sub-band analysis filters (24A and 24C) and the sub-band synthesis filters (26B and 26D), shown in FIG. 8, have characteristics which satisfy the filter conditions for performing the sub-band analysis and sub-band synthesis. Due to this difference in construction, the combined high frequency band signal P(R) of the P picture is ultimately obtained as one which results from the sub-band synthesis of the respective band signals P(LH), P(HL), and P(HH).

Further, for the I picture, the compressed signals DI(LH), DI(HL), and DI(HH), which are obtained by coding and re-quantizing the respective band signals I(LH), I(HL), and I(HH), as shown in FIG. 6, are transmitted and, on the decoding side, they are decoded to the band signals I(LH), I(HL), and I(HH) and sub-band combined, resulting in the combined high frequency band signal J(R).

In the case of the usual pyramid coding, the combined high frequency band signal J(R) of the I picture must be coded and then transmitted. As is clear from a comparison of FIG. 3 with FIG. 7, the combined high frequency band signal has the same number of pixels as that of the input image signal, while the total number of pixels of the high frequency band signals LH, HL, and HH is three-fourth the number of pixels of the input image. Therefore, the number of pixels in the latter case in which the band signals after being sub-band divided are coded is smaller and advantageous for the image information compression coding.

Figure 3:
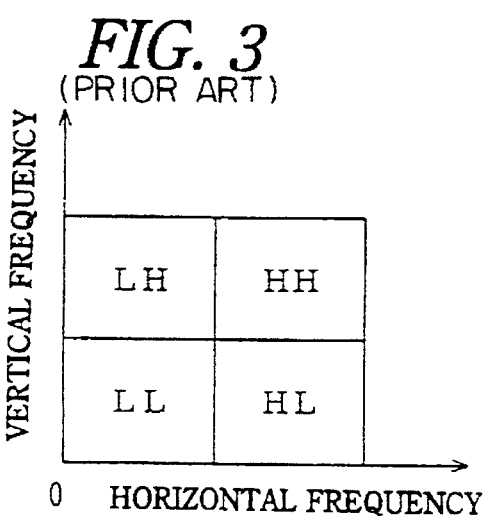
FIG. 3 illustrates a sub-band division.
Figure 4:
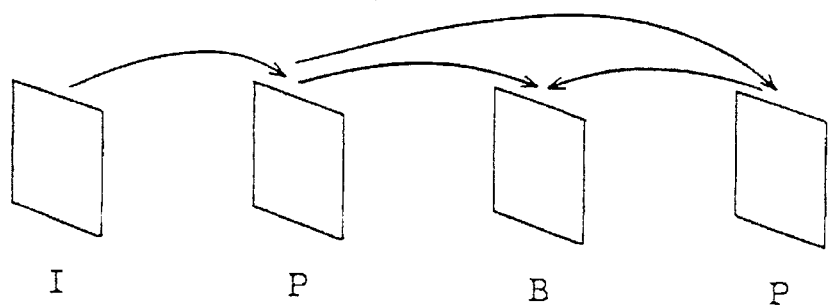
FIG. 4 illustrates a picture structure in interframe prediction coding.

(3) The sub-band division number is not limited to 4, shown in FIG. 11. For example, it may be possible to divide the input signal to 3 band signals in one of the vertical and horizontal directions. Alternately, it is possible to divide it to 4 band signals, as shown in FIG. 3, and then divide the LL band signal thereof by 4, so that a portion of the four LL band signals whose frequency in both the horizontal and vertical direction is low, is used as LL component and the remaining three LL band signals are sub-band combined as the high frequency component.

(4) The input image signal to the devices, shown in FIG. 6 or FIG. 8, may not be the whole image signal of one frame. For example, the HD image signal is sub-band divided in horizontal direction, and the high frequency band signal thereof is not subjected to the interframe motion compensation, and only the low frequency band signal is supplied to the device to process it, as mentioned previously.

What is claimed is:

1. An image information compression device for compressing an image information by sub-band dividing an image signal and performing a motion compensation prediction coding, comprising:

sub-band division means for sub-band dividing an image signal corresponding to a unit of image into a plurality of band signals including a low frequency band signal;

sub-band combining means for sub-band combining said plurality of band signals excluding said low frequency band signal and obtaining a combined high frequency band signal having an identical number of pixels as that of said image signal and having said plurality of band signals excluding said low frequency band signal;

intra-plane coding means for intra-plane coding each of said plurality of band signals obtained by sub-band dividing said image signal;

first and second inter-plane motion compensation coding means for performing motion compensation coding for said low frequency band signal and said combined high frequency band signal respectively; and selecting means for selectively enabling said inter-plane motion compensation means and said intra-plane coding means in response to said unit of said image.

2. An image information compression device for compressing an image information by sub-band dividing an image signal and performing a motion compensation prediction coding, comprising:

sub-band division means for sub-band dividing an image signal corresponding to a unit of image into a plurality of band signals including a first low frequency band signal;

sub-band combining means for sub-band combining said plurality of band signals excluding said first low frequency band signal and obtaining a combined high frequency band signal having an identical number of pixels as that of said image signal and having said plurality of band signals excluding said first low frequency band signal; and first and second inter-plane motion compensation coding means for performing motion compensation coding for said first low frequency band signal and said combined high frequency band signal respectively wherein said sub-band division means comprises:

first sub-band division means for obtaining, from said image signal, said plurality of band signals including said first low frequency band signal; and second sub-band division means for deriving a second low frequency band signal from said image signal, wherein said sub-band combining means comprises:

first sub-band combining means for obtaining a first combined high frequency band signal by sub-band combining said plurality of band signals obtained by said first sub-band division means excluding said first low frequency band signal; and second sub-band combining means for sub-band combining said second low frequency band signal and obtaining a second combined high frequency band signal by subtracting the sub-band combined second low frequency band signal from said image signal, wherein said first inter-plane motion compensation coding means performs a motion compensation coding in response to said first low frequency band signal obtained by said first sub-band division means and said second low frequency band signal obtained by said second sub-band division means; and said second inter-plane motion compensation coding means performs a motion compensation coding in response to said first combined high frequency band signal obtained by said first sub-band combining means and said second combined high frequency band signal obtained by said second sub-band combining means.

3. An image information compression device for compressing an image information by sub-band dividing an image signal and performing a motion compensation prediction coding, comprising:

sub-band division means for sub-band dividing an image signal corresponding to a unit of image into a plurality of band signals including a first low frequency band signal;

sub-band combining means for sub-band combining said plurality of band signals excluding said first low frequency band signal and obtaining a combined high frequency band signal having an identical number of pixels as that of said image signal and having said plurality of band signals excluding said first low frequency band signal; and first and second inter-plane motion compensation coding means for performing motion compensation coding for said first low frequency band signal and said combined high frequency band signal respectively, wherein said sub-band division means comprises:

first sub-band division means for obtaining, from said image signal, said plurality of band signals including said first low frequency band signal; and second sub-band division means for deriving a second low frequency band signal from said image signal, wherein said sub-band combining means comprises:

first sub-band combining means for obtaining a first combined high frequency band signal by sub-band combining said plurality of band signals obtained by said first sub-band division means excluding said first low frequency band signal; and second sub-band combining means for sub-band combining said second low frequency band signal and obtaining a second combined high frequency band signal by subtracting the sub-band combined second low frequency band signal from said image signal, wherein said first inter-plane motion compensation coding means performs a motion compensation coding in response to said first low frequency band signal obtained by said first sub-band division means and said second low frequency band signal obtained by said second sub-band division means; and said second inter-plane motion compensation coding means performs a motion compensation coding in response to said first combined high frequency band signal obtained by said first sub-band combining means and said second combined high frequency band signal obtained by said second sub-band combining means wherein said first inter-plane motion compensation coding means comprises:

first motion vector estimation means for detecting a first motion vector between said first low frequency band signal and said second low frequency band signal; and first motion compensation means for outputting a motion-compensated low frequency band signal by predicting said second low frequency band signal in response to said first motion vector and said first low frequency band signal, and wherein said second inter-plane motion compensation coding means comprises:

second motion vector estimation means for detecting a second motion vector between said first combined high frequency band signal and said second combined high frequency band signal, in response to said first combined high frequency band signal, said second combined high frequency band signal, and said first motion vector; and second motion compensation means for outputting a motion-compensated high frequency band signal by predicting said second combined high frequency band signal on the basis of said second motion vector and said first combined high frequency band signal.

4. An image information decompression device for decompressing an image information to obtain a decoded image signal, said image signal having a first number of pixels and including a low frequency band signal obtained by sub-band dividing an image signal of a unit of an image and a combined high frequency band signal obtained by sub-band combining a plurality of band signals obtained by said sub-band division excluding said low frequency band signal, and having the same number of pixels as that of said image signal, said low frequency band signal and said combined high frequency band signal being compressed by inter-plane motion compensation coding, said plurality of band signals being compressed by intra-plane coding, said inter-plane motion compensation coding and said intra-plane coding being enabled alternately in response to said unit of said image, the image information decompression device comprising:

intra-plane decoding means for decoding each of said plurality of intra-plane coded band signals and outputting a plurality of decoded band signals, first and second motion compensation decoding means using inter-plane motion compensation decoding for decoding motion compensation of said compressed low frequency band signal and said compressed combined high frequency band signal and outputting a decoded low frequency band signal and a decoded combined high frequency band signal;

first sub-band combining means for sub-band combining said plurality of decoded band signals and obtaining said decoded image signal;

second sub-band combining means for sub-band combining said decoded low frequency band signal and said decoded combined high frequency band signal and obtaining a decoded image signal; and selecting means in response to said unit of said image for selectively enabling said intra-plane decoding means and said first and second motion compensation decoding means and selectively enabling said first and second sub-band combining means.

5. The image information compression device, claimed in claim 1, wherein said inter-plane motion compression coding means comprises:

first motion compensation coding means for performing a motion compensation coding in response to said low frequency band signal obtained by said sub-band division means; and second motion compensation coding means for performing a motion compensation coding in response to said combined high frequency band signal obtained by said sub-band combining means.

6. The image information decompression device, claimed in claim 4, wherein said motion compensation decoding means comprises:

first motion compensation decoding means for performing a motion compensation decoding in response to said compressed low frequency band signal; and second motion compensation decoding means for performing a motion compensation decoding in response to said compressed combined high frequency band signal.

* * * * *